(12) United States Patent
Reese et al.

(10) Patent No.: US 9,396,826 B2
(45) Date of Patent: Jul. 19, 2016

(54) ISOTOPE PRODUCTION TARGET (75) Inventors: Steven Richard Reese, Corvallis, OR (US); Todd Stephen Palmer, Corvallis, OR (US); Stephen Todd Keller, Corvallis, OR (US); Madicken Munk, Corvallis, OR (US)

(73) Assignee: OREGON STATE UNIVERSITY, Corvallis, OR (US)

( * ) Notice: Subject to any disclaimer, the term of this patent is extended or adjusted under 35 U.S.C. 154(b) by 1182 days.

(21) Appl. No.: 13/192,300

(22) Filed: Jul. 27, 2011

(65) Prior Publication Data

US 2012/0027152 A1   Feb. 2, 2012

Related U.S. Application Data

(60) Provisional application No. 61/368,762, filed on Jul. 29, 2010.

(51) Int. Cl.
*G21G 1/00* (2006.01)
*G21G 1/02* (2006.01)
*G21K 5/08* (2006.01)

(52) U.S. Cl.
CPC .. *G21G 1/02* (2013.01); *G21G 1/00* (2013.01); *G21K 5/08* (2013.01); *G21G 2001/0036* (2013.01)

(58) Field of Classification Search
CPC ............... G21G 1/001; G21G 2001/00
USPC .................................. 376/186, 202
See application file for complete search history.

(56) References Cited

U.S. PATENT DOCUMENTS

| | | | | |
|---|---|---|---|---|
| 3,833,469 A | * | 9/1974 | Robson | 424/1.61 |
| 3,928,132 A | | 12/1975 | Bujas | |
| 4,017,583 A | * | 4/1977 | Motojima et al. | 423/2 |
| 4,372,817 A | | 2/1983 | Armijo et al. | |
| 4,782,231 A | * | 11/1988 | Svoboda et al. | 423/249 |

(Continued)

FOREIGN PATENT DOCUMENTS

| | | | | |
|---|---|---|---|---|
| CN | 103038831 | | 4/2013 | |
| EP | 2 104 113 B1 | * | 11/2012 | G21G 1/02 |
| WO | 96/13038 A1 | | 5/1996 | |
| WO | 9732313 | | 9/1997 | |
| WO | 9741565 A1 | | 11/1997 | |
| WO | 2012015974 | | 2/2010 | |

OTHER PUBLICATIONS

F.M. Bsebsu et al., "Reactivity-Induced Transient Modeling for Tajoura Nuclear Research Reactor With HEU and LEU Fuels", The RERTR-2006 International Meeting on Reduced Enrichment for Research and Test Reactors, Oct. 29-Nov. 2, 2006, Cape Town, Republic of South Africa, http://www.rertr.anl.gov/RERTR28/Abstracts/S13-1_Bsebsu.html, website accessed Jun. 16, 2011, 9 pages.

(Continued)

*Primary Examiner* — Jack W Keith
*Assistant Examiner* — Sharon M Davis
(74) *Attorney, Agent, or Firm* — Schwabe, Williamson & Wyatt (57) ABSTRACT

An isotope production target may include an outer diameter wall and an inner diameter wall. An isotope source may be located between the inner diameter wall and the outer diameter wall, and the isotope source may comprise fissile material interspersed with one or more voided regions. A central region may be located within the inner diameter wall, and the central region may be configured to house a neutron thermalization volume.

22 Claims, 8 Drawing Sheets

(56) References Cited

U.S. PATENT DOCUMENTS

| | | |
|---|---|---|
| 8,450,629 B2 | 5/2013 | Pitcher |
| 2007/0133733 A1 | 6/2007 | Popa-Simil |
| 2007/0258556 A1* | 11/2007 | Song et al. ................... 376/455 |
| 2009/0238322 A1 | 9/2009 | Liu et al. |
| 2010/0215137 A1* | 8/2010 | Nagai et al. ................... 376/158 |
| 2012/0207264 A1* | 8/2012 | Van Den Berghe et al. .. 376/414 |

OTHER PUBLICATIONS

H3XK, "Research Nuclear Fuel Production", TVEL Fuel Company of Rosatom, http://www.nccp.ru/EN/ir/, website accessed Jun. 16, 2011, 2 pages.

Z.K. Saralidze et al., "Considerations on Long-Term Storage of Spent Fuel at the Research Nuclear Reactor of the Institute of Physics of the Georgian Academy of Sciences", IPPE, Obninsk, Russia, Mar. 1997, updated Apr. 2006, http://www.nti.org/db/nisprofs/georgia/fulltext/geoirtm/geoirtm.htm, website accessed Jun. 16, 2011, 8 pages.

United States Patent and Trademark Office; "International Search Report and Written Opinion"; PCT Application No. PCT/US2011/045613; Dec. 12, 2011; 11 pages.

Stolowitz Ford Cowger LLP; "Listing of Related Cases"; Dec. 15, 2011; 1 page.

Australian Patent Office, "Patent Examination Report No. 2" for AU App. No. 2011282744, dated Nov. 15, 2013, 5 pages.

* cited by examiner

ISOTOPE PRODUCTION TARGET

This application claims priority to U.S. Provisional Application Ser. No. 61/368,762 filed on Jul. 29, 2010, the specification of which is herein incorporated by reference in its entirety.

BACKGROUND

Radioactive molybdenum ($^{99}$Mo) is used to produce technetium ($^{99m}$Tc), which is an ingredient for a wide range of radiopharmaceuticals used in the health care industry. A continuous supply of the technetium isotope is needed for approximately 80% of all nuclear medicine procedures worldwide, including nearly 50,000 diagnostic procedures per day in the U.S. alone. The demand may continue to grow as the world's population ages.

Conventional production of molybdenum occurs in high power reactors, e.g., nuclear reactors which produce in excess of ten megawatts of thermal energy. Current regulations may allow for a limited or restricted use of the high power reactors utilizing highly-enriched uranium (HEU) for generation of isotopes such as molybdenum. However, the heightened scrutiny due to concerns over proliferation of HEU may ultimately limit or prohibit the use of this material for the production of molybdenum and other radioactive isotopes.

Countries such as the United States may find themselves in a compromised position concerning the future production of molybdenum. The sole source of molybdenum in North America is presently located in Canada, and there is growing concern that the continued availability of molybdenum from this source may end in the near future. Although there are other sources in Europe, the half life of molybdenum is sufficiently short, (2.75 days), making transportation around the world an untenable solution. Accordingly, for many countries, local production of molybdenum may be the only viable long term option.

DETAILED DESCRIPTION

Figure 1:
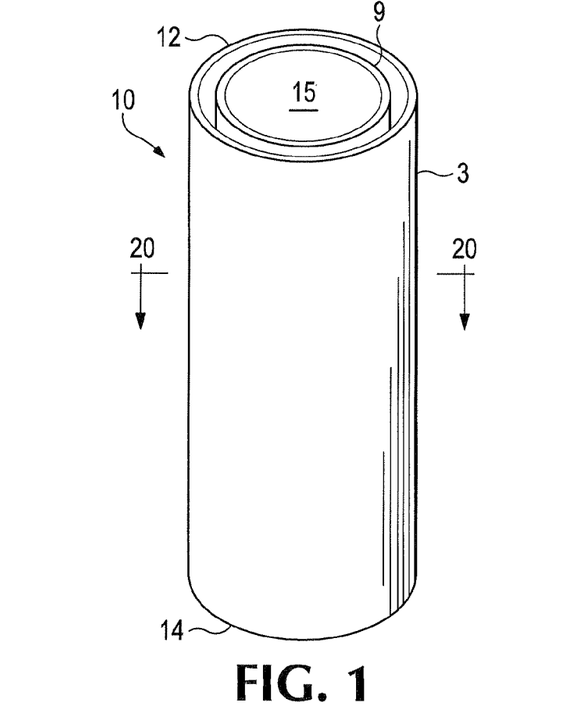
FIG. 1 illustrates an example isotope target.

FIG. 1 illustrates an example isotope target 10. The isotope target 10 may be used to produce a radioactive isotope such as molybdenum ($^{99}$Mo). The isotope target 10 is illustrated as being cylindrical in shape, with an outer diameter wall 3 and an inner diameter wall 9. However, targets having other shapes are contemplated herein, including hexagonal cross-sections and other geometries.

The outer diameter wall 3 may be associated with a first diameter, and the inner diameter wall 9 may be associated with a second diameter. The first diameter is greater than the second diameter. The isotope target 10 may comprise a central region 15 which extends from a first end 12 of the isotope target 10 to a second end 14 of the isotope target 10. The central region 15 may comprise a hollow portion, a channel, a cavity, a through-hole, a tube, or the like.

Figure 2:
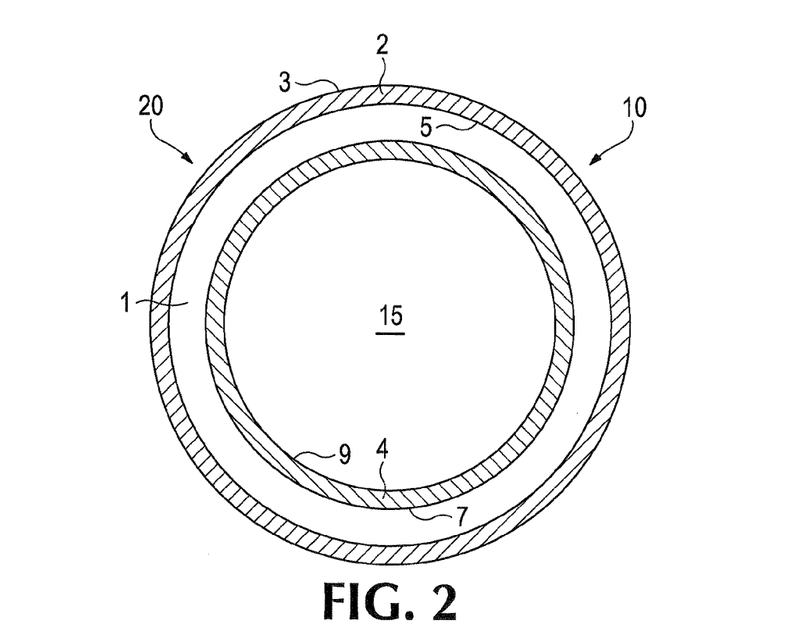
FIG. 2 illustrates a cross-section of the example isotope target of FIG. 1.

FIG. 2 illustrates a cross-section 20 of the example isotope target 10 of FIG. 1. The isotope target 10 may comprise a first tube 2 and a second tube 4. The second tube 4 may be nested with the first tube 2 to form a target chamber 1. The first tube 2 may comprise the outer diameter wall 3 of the isotope target 10 and an inside wall 5. The second tube 4 may comprise the inner diameter wall 9 of the isotope target 10 and an outside wall 7. The target chamber 1 may be located between the inside wall 5 of the first tube 2 and the outside wall 7 of the second tube 4.

In one example, the target chamber 1 may extend substantially the entire length of the isotope target 10. The target chamber 1 may be sealed at the first end 12 (FIG. 1) and the second end 14 (FIG. 1) of the isotope target 10. Additionally, a target material including an isotope source or other radioactive and/or fissile material, such as uranium, e.g., $^{235}$U, may be located in the target chamber 1. The target material may be located between the inner diameter wall 9 and the outer diameter wall 3. In one example, the target material may be interspersed with one or more voided regions.

The central region 15 may be located within the inner diameter wall 9. In one example, the central region 15 may be configured to house a neutron thermalization volume. For example, the neutron thermalization volume may comprise water, heavy water, graphite, zirconium, plastic, wax, paraffin, hydrogenous materials, other types of neutron moderators, or any combination thereof. The central region 15 may form a water channel configured to allow water to flow through the isotope target 10. For example, water may enter the central region 15 through the first end 12 (FIG. 1) and exit the central region 15 at the second end 14 (FIG. 1). In another example, the central region 15 may comprise a completely enclosed chamber configured to house the neutron thermalization volume.

The central region 15 may be configured to cause neutrons that are generated in the target material located in the target chamber 1 to be thermalized by the neutron thermalization volume before re-entering the target material. The neutron thermalization volume, e.g., water or primary coolant, may also be used to remove heat from and/or cool the isotope target 10 during fission events and/or during an isotope production process. The target material may be located within the target chamber 1 in a variety of different geometries.

Figure 3:
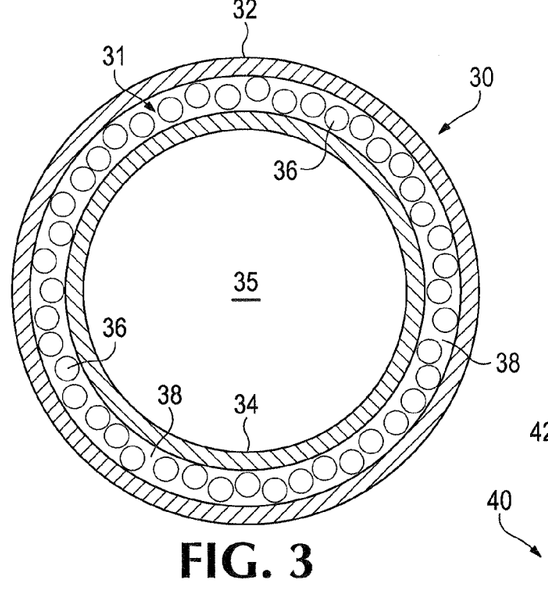
FIG. 3 illustrates an example isotope production target.

FIG. 3 illustrates an example isotope production target 30 shown, by way of example, with a cross-sectional view of an isotope target, similar to isotope target 10 illustrated in FIG. 1. The isotope production target 30 may comprise an outer cladding 32 and an inner cladding 34. Target material 31 may be located between the outer cladding 32 and the inner cladding 34. The target material 31 may comprise fissile material 36 and one or more voided regions 38.

The one or more voided regions 38 may be configured to capture fission product gases produced from the fissile material 36. Capturing the fission product gases in the one or more voided regions 38 may reduce the amount of fission product gases that become interstitial and which may otherwise cause structural degradation of the surrounding cladding in a target which does not include any voiding between the fissile material and the cladding.

In one example, the fissile material 36 may comprise fissile source pellets, and the one or more voided regions 38 may comprise spacing or gaps between the pellets. The fissile material 36 may comprise a plurality of individual source objects, may be stored in a powder form, or take other physical forms such as balls, fragments, particles, sheets, rods, foils, other geometries, or any combination thereof.

The one or more voided regions 38 may be sealed to prevent the fission gases from exiting the isotope production target 30. For example, the target material 31 may be contained in a sealed chamber located between the outer cladding 32, the inner cladding 34, and the ends of the isotope production target 30, such as the first end 12 and the second end 14 of the isotope target 10 illustrated in FIG. 1. The voided regions 38 may comprise one or more gases, a vacuum, or a partial vacuum, e.g., prior to capturing any fission product gases.

A central region 35 of the isotope production target 30 may comprise a neutron thermalization volume or neutron moderator. The neutron thermalization volume may comprise water. In one example, the isotope production target 30 may be configured to be installed in a reactor core, and the neutron thermalization volume may comprise a primary coolant associated with the reactor core. The reactor core may be associated with a low power reactor with less than ten megawatts of thermal output. For example, a low power reactor such as a Training, Research, Isotopes, General Atomics, or TRIGA®, reactor may be used to produce certain isotopes, such as molybdenum.

The isotope production may be accomplished through a series of operations or generalized steps. In a first operation, a suitable isotope production target may be manufactured. Manufacture of an isotope production target, such as the isotope production target 30, may comprise placing a target material, such as uranium, in a particular geometry within the isotope production target.

In a second operation, the isotope production target may be irradiated by a neutron source. For example, the isotope production target may be placed in a nuclear reactor. During irradiation, fission reactions in the target material may produce one or more isotopes, such as molybdenum. Fission gases or by-products are also typically generated during the fission reactions. In one example, the fission gases and/or by-products may be captured or stored within voided regions interspersed with the target material.

In a third operation, the isotope production target may be transported to a hot cell facility for remote handling. Inside the hot cell, the irradiated target material may be removed from the cladding. In one example, an end of the isotope production target, such as the first end 12 illustrated in FIG. 1, may be cut or otherwise removed to extract the target material. For example, the fissile material 36 illustrated in FIG. 3 may be loosely placed within the chamber 1 (FIG. 2) for easy removal, e.g., by inverting the isotope target 10 with the first end 12 removed. A series of chemical separations of the target material may be performed to produce or extract the desired end product, such as pure molybdenum.

In a fourth operation, the end product may be transported to a destination such as a distribution facility, a hospital, a clinic, a laboratory, a test facility, a research facility, a place of business, a governmental facility, or the like. In one example, technetium ($^{99m}$Tc) that is obtained from the end product, e.g., molybdenum, may be used for medical procedures at the destination.

Figure 4:
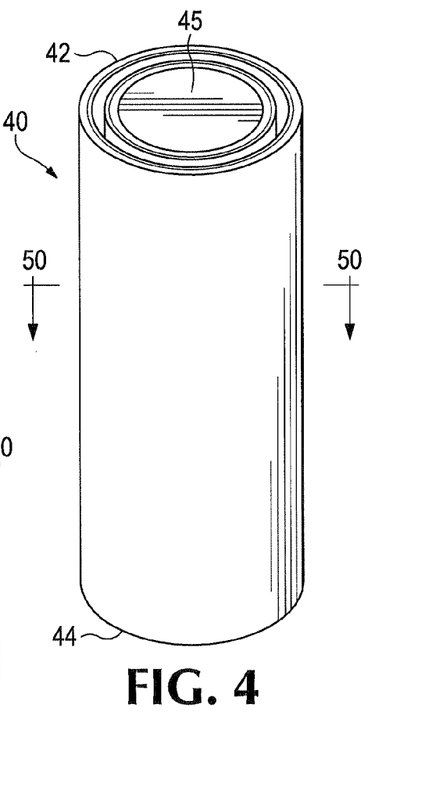
FIG. 4 illustrates an example target and a target core.

FIG. 4 illustrates an example target 40 and a central region 45. The target 40 may comprise a first end 42 and a second end 44. In one example, one or both of the first end 42 and the second end 44 may be removed, e.g., after the target 40 has been irradiated.

The target may be configured to have an outside diameter of approximately 1.43 inches (3.63 centimeters) and a height of approximately 22 inches (171.63 centimeters). The target 40 may be configured to approximate the overall dimensions of a fuel element for a TRIGA® reactor, or other type of reactor.

Figure 5:
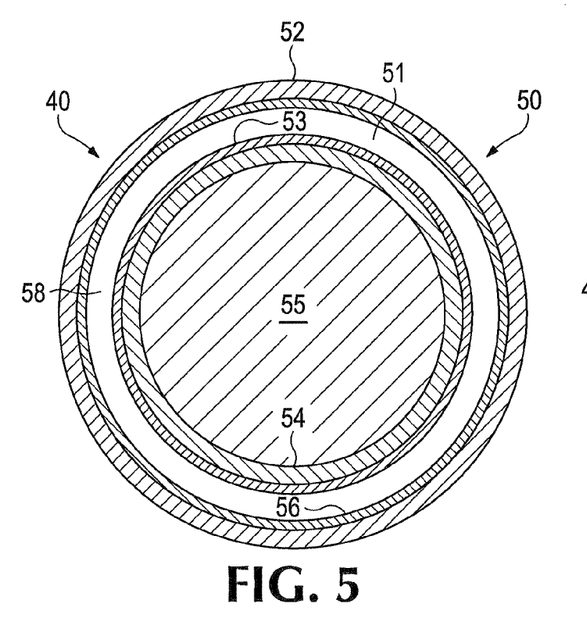
FIG. 5 illustrates a cross-section of the example target of FIG. 4.

FIG. 5 illustrates a cross-section 50 of the example target 40 of FIG. 4 taken at or near the first end 42. The target 40 may comprise an outer cladding 52, an inner cladding 54, and a target chamber 51 formed there between. Fissile material may be located within the chamber 51. In one example, the fissile material may comprise two layers of fissile material, including a first layer 53 and a second layer 56. A voided region 58 may be located between the first layer 53 and the second layer 56. The voided region 58 may comprise an annulus, or be annular in shape.

The voided region 58 may be filled with a gas, or gases, or may be configured as a vacuum, or a partial vacuum. The voided region 58 may be configured to operate as storage or a volume for collecting fission product gases and/or by-products. Initially providing the voided region 58 with the vacuum, or partial vacuum, may allow for the collection of a greater amount of the fission product gases generated during irradiation of the fissile material, in order to further reduce an overall pressure within the voided region 58 during an isotope production operation.

The outer cladding 52 and the inner cladding 54 may comprise two nested and/or sealed tubes. The top and bottom of the nested tubes may be sealed such that fission gases produced during irradiation may be trapped in the voided region 58. The outer cladding 52 and/or the inner cladding 54 may be made of stainless steel, aluminum, and/or other materials, and may be manufactured with a thickness that is nominally 0.020 inches (0.06 centimeters). The precise thickness of the fissile material and cladding may vary depending on various design considerations, such as available neutron flux, production yield requirements, material characteristics, reactor core geometry, or any combination thereof.

The inner cladding 54 may be configured as a channel or a container for a neutron moderator 55. The neutron moderator 55 may be located within the inner cladding 54 and may be configured to cause neutrons that are generated in the fissile material, e.g., the first layer 53 and/or the second layer 56, to be thermalized by the neutron moderator 55 before re-entering the fissile material. The thermalized neutrons may be used to produce additional fission events in the first layer 53 and/or the second layer 56.

In one example, the neutron moderator 55 may comprise graphite, zirconium, plastic, wax, parafin, hydrogenous materials, other types of neutron moderators, or any combination thereof. In another example, the neutron moderator 55 may comprise water, such as light water or heavy water, which is allowed to flow through the channel formed within the inner cladding 54 during an isotope production operation. The neutron moderator 55 may comprise primary coolant from a reactor. The outer cladding 52 and/or the inner cladding 54 may keep the first layer 53 and the second layer 56 from contacting any water or primary coolant.

In one example, a hole may be opened, e.g., punched, in the side of the target 40 and the fission gases and/or by-products may be extracted from the voided region 58 to be collected and/or stored. One or both ends of the target 40, e.g., the first end 42 and/or the second end 44 (FIG. 4), may be removed or cut. The end product, e.g., molybdenum, may be extracted from the first layer 53 and/or the second layer 56. For example, the end product may be chemically separated from the irradiated material.

The rate of fission reactions in an isotope production target may be described by the equation:

$$R=\phi\sigma N,$$

where
R=reaction rate density of fission [fissions cm$^{-3}$ s$^{-1}$]
$\phi$=neutron flux from reactor [neutrons cm$^{-2}$ s$^{-1}$]
$\sigma$=microscopic cross-section for fission [cm$^{-2}$]
N=atomic density of target atoms [atoms cm$^{-3}$]

Neutrons and fission fragments may be produced directly from fission events. About 6.5% of the time, the isotope molybdenum may be created as a fission fragment of an $^{235}$U target irradiated with thermal neutrons. The above equation may describe a fission rate density in a fissile material. In order to maximize the fission rate density, the values of flux and atomic density in the equation may be changed; the microscopic cross-section is a fixed parameter. Many types of research reactors and low power reactors may be associated with a nominal power of one megawatt thermal (MW$_t$) and may have neutron fluxes on the order of 1E13 neutrons cm$^{-2}$ s$^{-1}$.

With the cross-section fixed, the atomic density N and/or the neutron flux $\phi$ may be increased by configuring the geometry and/or the materials of the target as described herein, with reference to the various examples. Although the flux of neutrons emanating from the reactor core may be associated with a fixed value in some examples, the geometry of the target may be used to increase the flux of neutrons within the target itself.

The neutron flux $\phi$ may comprise the flux of neutrons from both the reactor core and from the target, e.g., neutrons generated within the target. Neutrons born from fission events in the target may have the opportunity to thermalize within the neutron moderator, such as water, located within the target, and the thermal neutrons may continue on to create more fission reactions in the target.

In one example, substantially all of the fissile material, e.g., uranium, may be located on one layer (e.g., on the inside surface of the outer cladding 52). However, having two layers of fissile material, e.g., the first layer 53 and the second layer 56, may provide for improved removal of heat from the fission reactions. For example, the amount of heat removed from the target 40 may correspond to the amount of surface area of the cladding that is in direct contact with the neutron moderator 55, e.g., water. In one example, both the outer wall of the outer cladding 52 and the inner wall of the inner cladding 54 may be exposed to water, which may cool the surface(s) of the target 40.

To increase the atomic density (N) of the target material, e.g., uranium, the target 40 may be configured with uranium metal which has a density of approximately 18 g cm$^{-3}$ or nearly four times the density of uranium oxide (UO$_2$). A higher density results in a higher atomic density N. In one example, the target material may comprise low-enriched uranium (LEU), enriched to approximately 19.75%. Fissile material which is enriched at or above 20% may be termed or defined as HEU, and fissile material which is enriched below 20% may be termed or defined as LEU.

The thickness of the first layer 53 and/or the second layer 56 may be allowed to vary depending upon the desired mass of target material. The greater the mass, the greater the value of N and therefore the greater the production rate of molybdenum. In one example, the first layer 53 and/or the second layer 56 may be "sputtered" onto, or otherwise adhered to, the outer wall 52 and the inner wall 54, respectively. The first layer 53 may have a different mass compared to the second layer 56 due to a difference between their radial location, e.g., cylindrical geometry, and/or thickness.

In one example, the first layer 53 and the second layer 56 may be loosely fit within the target chamber 51, e.g., not adhered to either the inner wall 54 or the outer wall 56, respectively. Accordingly, the first layer 53 and the second layer 56 may be physically removed from the target 40 without performing any chemical or thermal treatment. In another example, a chemical may be inserted or injected into the voided region 58 after the fissile material has been irradiated, in order to dissolve the first layer 53 and the second layer 56, for removal from the cladding.

Figure 6:
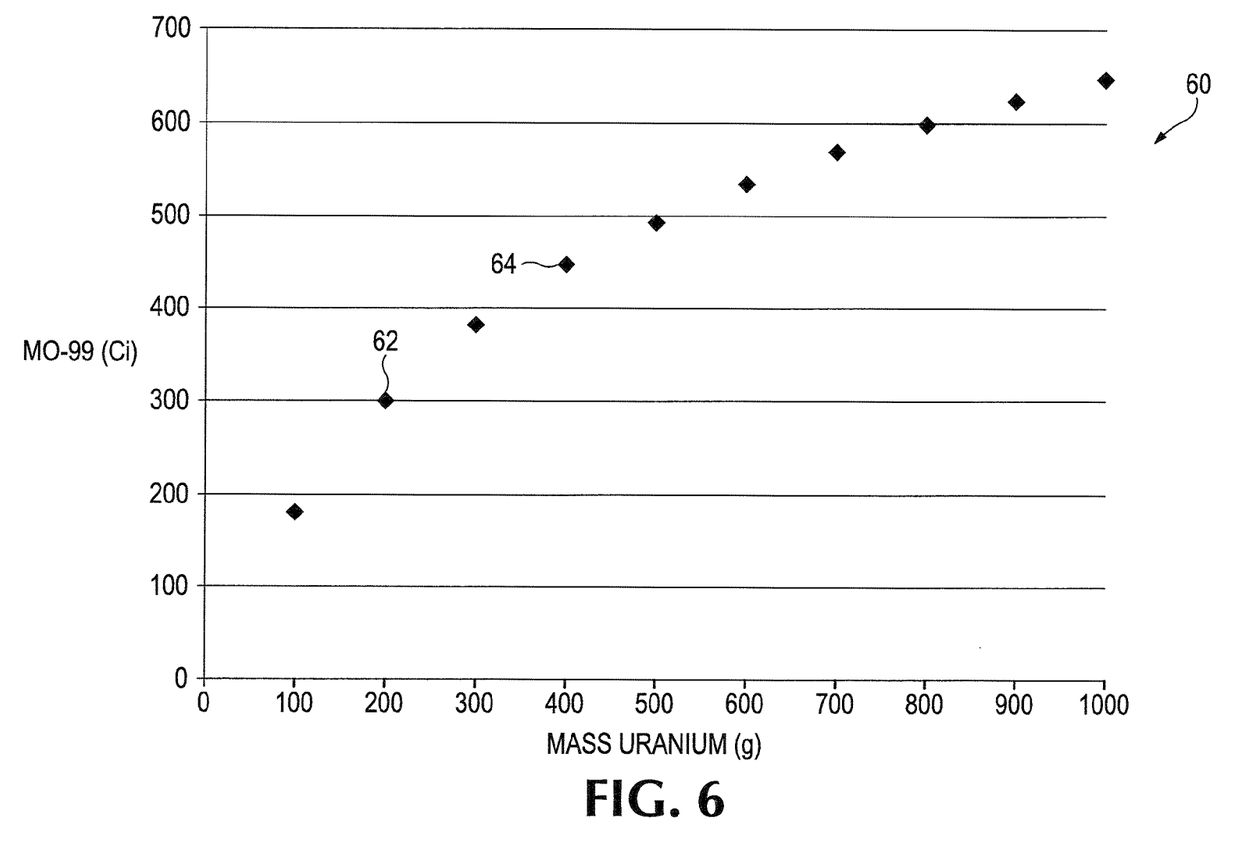
FIG. 6 illustrates a table showing an example isotope production rate.

FIG. 6 illustrates a table 60 showing an example isotope production rate. Table 60 illustrates the production of molybdenum as a function of target mass, e.g., uranium. A relative change in isotope production may be determined as a function of the mass of the fissile material within the target.

The target may comprise a mass of fissile material selected somewhere between 200 and 400 grams; although other masses of fissile material may be used. In one example 62, a target comprising a mass of 200 grams of uranium may produce approximately 300 Curies (Ci) of molybdenum (99Mo), and in another example 64, a target comprising a mass of 400 grams of uranium may produce approximately 450 Curies of molybdenum.

As the mass of fissile material is increased, the amount of the end product, such as molybdenum, may also increase. This increase in amount of the end product may not be linear though because the neutron flux may diminish as it penetrates the fissile material. This phenomenon may be termed or known as self-shielding. As a result, the example isotope production curve illustrated in FIG. 6 may approach or reach a maximum value instead of continuing to increase linearly with mass of the fissile material. The mass of the fissile material may be varied by increasing or decreasing a diameter, a thickness, a length, a width, a height, a composition, or any combination thereof, associated with the fissile material.

Figure 7:
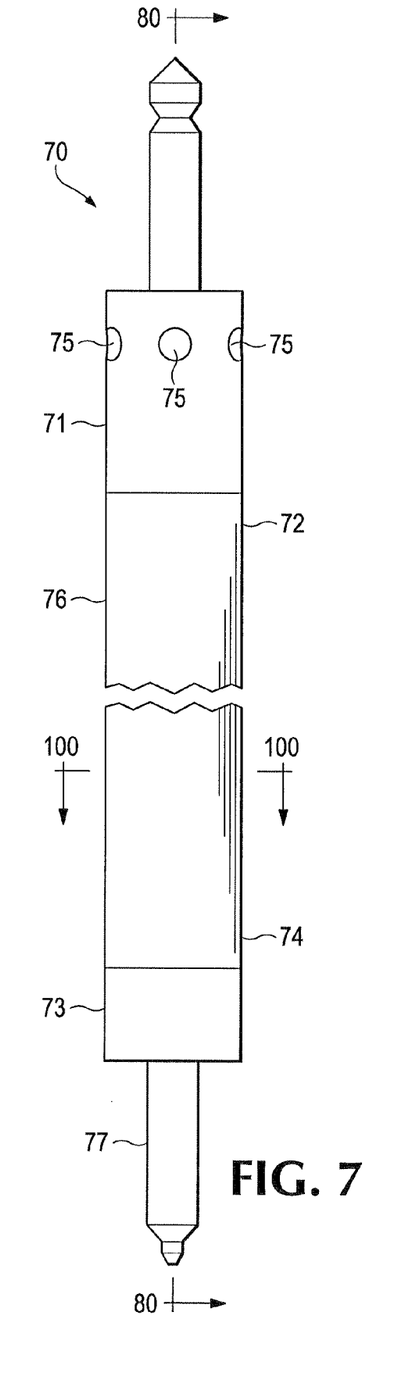
FIG. 7 illustrates an example target assembly.

FIG. 7 illustrates an example target assembly 70 comprising an isotope production target 76. In one example, the isotope production target 76 may be approximately sized as a fuel element of a reactor core. A mounting structure 77 may be coupled to the isotope production target 76 and may be configured for insertion of the isotope production target 76 into a reactor core. A first portion 71 of the mounting structure 77 may be coupled to the isotope production target 76 at a first end 72, and a second portion 73 of the mounting structure 77 may be coupled to the isotope production target 76 at a second end 74.

The mounting structure 77 may comprise one or more holes 75. The one or more holes 75 (hereafter "holes") may be configured to direct water or primary coolant into or through the target assembly 70. The holes 75 may be located about a circumference of one or both of the first portion 71 and the second portion 73. The holes 75 may be configured to provide a path for water or primary coolant to enter into, or exit out of, the target assembly 70.

Figure 8:
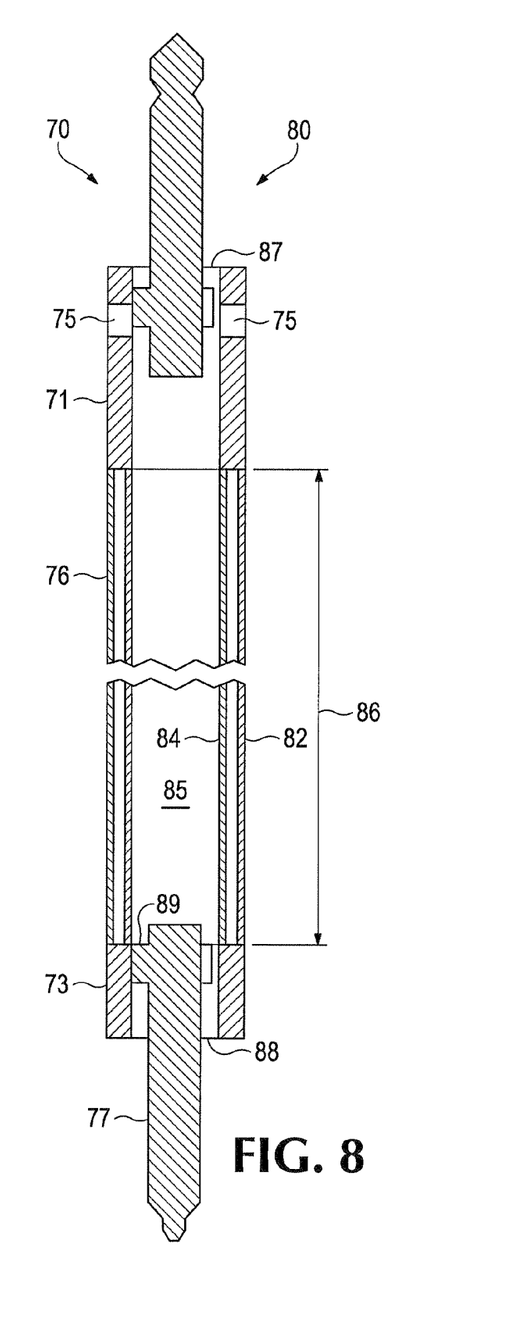
FIG. 8 illustrates a cross-section of the example target assembly of FIG. 7.

FIG. 8 illustrates a cross-section 80 of the example target assembly 70 of FIG. 7. The isotope production target 76 may comprise an outer wall 82 and an inner wall 84. The isotope production target 76 may be configured to contain fissile material in an isotope production chamber located between the outer wall 82 and the inner wall 84. Additionally, the isotope production target 76 may comprise a central region 85 located within the inner wall 84. In one example, the length 86 of the fissile material included in the isotope production target 76 may be approximately 20 inches.

The mounting structure 77 may be configured to direct primary coolant associated with a reactor core to pass through the central region 85. In addition to, or in place of, holes 75 the mounting structure 77 may comprise a first opening 87 located in or near the first portion 71, and a second opening 88 located in or near the second portion 73. One or both of the first opening 87 and the second opening 88 may be configured to allow water or primary coolant to pass into, or out of, the central region 85. The central region 85 may be configured to thermalize neutrons generated by the fissile material when the isotope production target 76 is inserted into the reactor core.

The mounting structure 77 may comprise a connecting device 89. The connecting device 89 may be configured to couple the mounting structure 77 to the isotope production target 76. Each of the first portion 71 and the second portion 73 of the mounting structure may be coupled to the isotope production target 76 by a connecting device, such as the connecting device 89.

Figure 9:
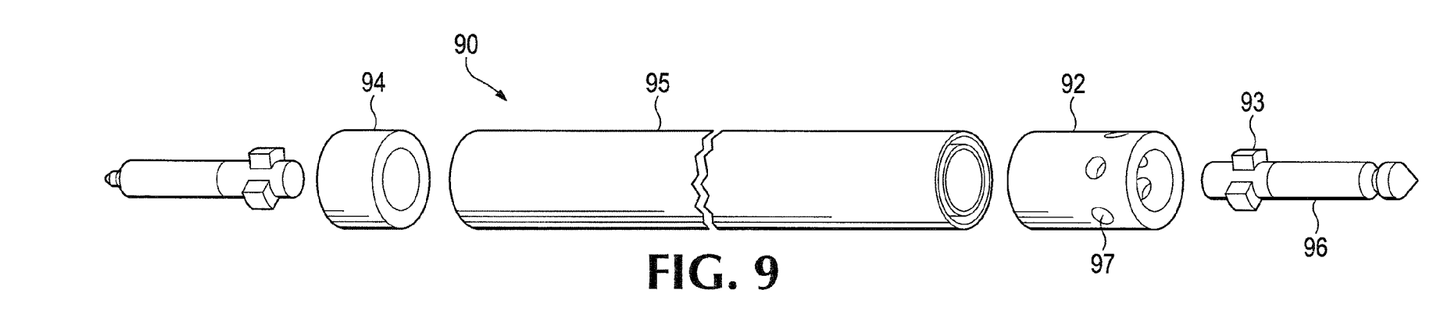
FIG. 9 illustrates an exploded view of an isotope production assembly.

FIG. 9 illustrates an exploded view of an isotope production assembly 90, including an isotope target structure 95, a first mounting structure 92, and a second mounting structure 94. The first mounting structure 92 may comprise one or more openings 97 configured to allow coolant to flow into and/or out of the isotope target structure 95. The second mounting structure 94 also may comprise one or more openings. The first mounting structure 92 and the second mounting structure 94 each may comprise a target insert 96. The target insert 96 may comprise a connecting device 93. In one example, the connecting device 93 may be configured to connect the target insert 96 to the first mounting structure 92 and/or to the isotope target structure 95.

Figure 10:
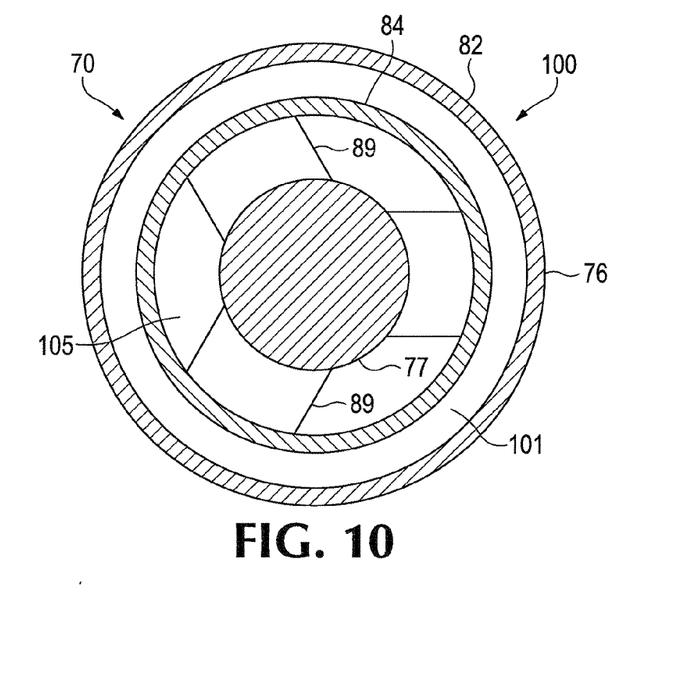
FIG. 10 illustrates a further cross-section of the example target assembly of FIG. 7.

FIG. 10 illustrates a further cross-section 100 of the example target assembly 70 of FIG. 7. The mounting structure 77 may be connected to the isotope production target 76 by connecting device 89. The connecting device 89 may comprise one or more support arms, flutes, webbing, or the like. The support arms may radiate outward from the mounting structure 77 to connect to the isotope production target 76.

One or more openings, such as opening 105 may be formed between or through the connecting device 89. In one example, the mounting structure 77 may be configured to direct water or primary coolant through the opening 105 into the isotope production target 76. Water or primary coolant passing through the isotope production target 76 may be allowed to exit the opening 105.

An isotope production chamber 101 may be located between the outer wall 82 and the inner wall 84, and may be configured to house fissile material. Neutrons generated in the fissile material may be thermalized, or moderated, by the water or primary coolant entering and/or exiting the isotope production target 76 before re-entering the isotope production chamber 101. The neutrons that re-enter the fissile material may cause additional fission events that may generate further neutrons that may then be thermalized by the primary coolant in the central region of the isotope production target 76.

Figure 11:
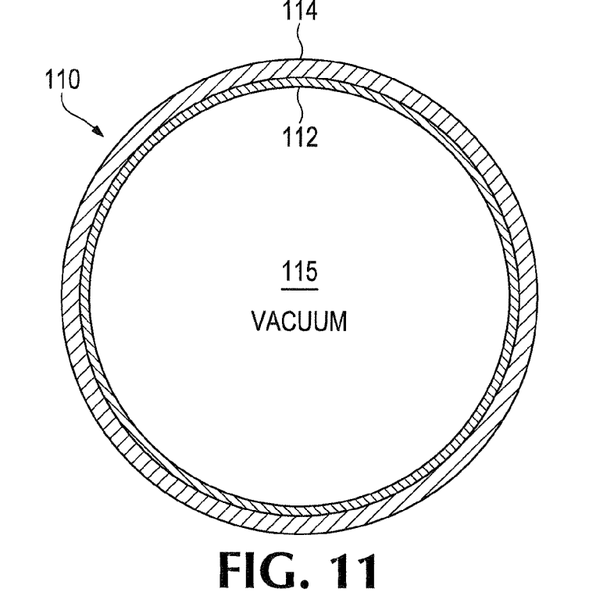
FIG. 11 illustrates a target with a vacuum chamber.

FIG. 11 illustrates a target 110 comprising a vacuum chamber 115. The target 110 may comprise a single, thin-walled stainless steel tube 112 coated on the inside with uranium oxide ($UO_2$) 114. The uranium oxide 114 may comprise HEU with an enrichment of approximately 93% and a density of approximately 4.8 g cm$^{-3}$. The illustrated target 110 may be similar to targets used in a so called "Centichem" process utilizing a high power reactor.

Any neutrons produced from fission in the uranium oxide 114 may not have the opportunity to thermalize in the vacuum chamber 115 while the neutrons remain in the target 110. Accordingly, the probability that these high energy neutrons will produce another fission event of the uranium oxide 114 may be extremely low. The vast majority of neutrons produced from the fission events may simply leak out of the target. Instead, the target 110 may have to rely on neutrons entering the stainless steel tube 112 from the outside of the target 110, e.g., neutrons born from a remote neutron source. Accordingly, the neutron flux associated with the target 110 may be less than the neutron flux associated with a target, such as the isotope target 10 of FIG. 1, which includes a central region configured to house a neutron thermalization volume.

Coating the uranium oxide on the inside of the stainless steel tube 112 may require processing the material in a chemical bath. The chemical bath may be used to dissolve both the uranium oxide 114 and the stainless steel tube 112, which may complicate the separation and processing of the desired isotopes. There may be no space or voiding between the uranium oxide 114 and the stainless steel tube 112.

Figure 12:
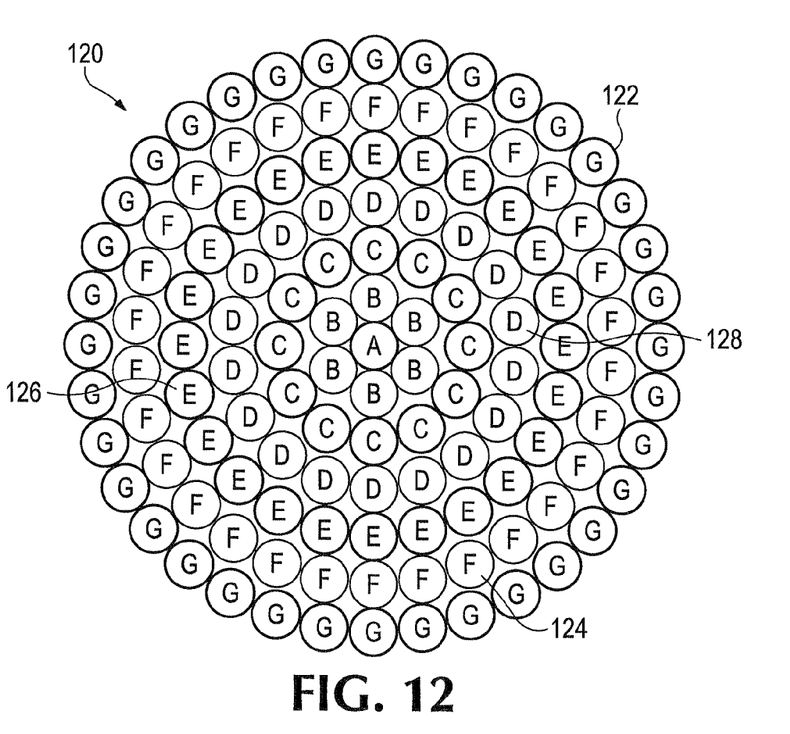
FIG. 12 illustrates an example lattice configuration.

FIG. 12 illustrates an example lattice configuration 120. The lattice configuration 120 may comprise a grid plate for a reactor core assembly comprising a plurality of fuel rods and one or more targets. In one example, the lattice configuration 120 may comprise a number of concentric rings of fuel rods. In the illustrated example, an outer ring 122, or "G-ring", may comprise thirty-six positions; an "F-ring" 124 may comprise thirty positions; an "E-ring" 126 may comprise twenty-four positions; a "D-ring" 128 may comprise eighteen positions, etc. A central position, or "A-ring" may comprise a single position.

One or more targets may be located at any of the positions of the lattice configuration 120. In one example, a target may be located in a position associated with the outer ring 122, in order to facilitate access, e.g., installation and/or retrieval, of the target. The position of the target may also be used to control the neutron flux received by the target and/or the heat generated by the target. In order to increase the power density and/or the neutron flux, the target may be moved closer to the center of the lattice configuration 120.

In one example, approximately two fuel rods may be removed from the lattice configuration 120 for every three targets added. One or more targets may be added to the lattice configuration 120 while maintaining the overall design characteristics, e.g., certification and operating criteria, of the reactor. The target may be placed in the reactor core for a number of hours or days, e.g., six days, during the isotope production process.

Figure 13:
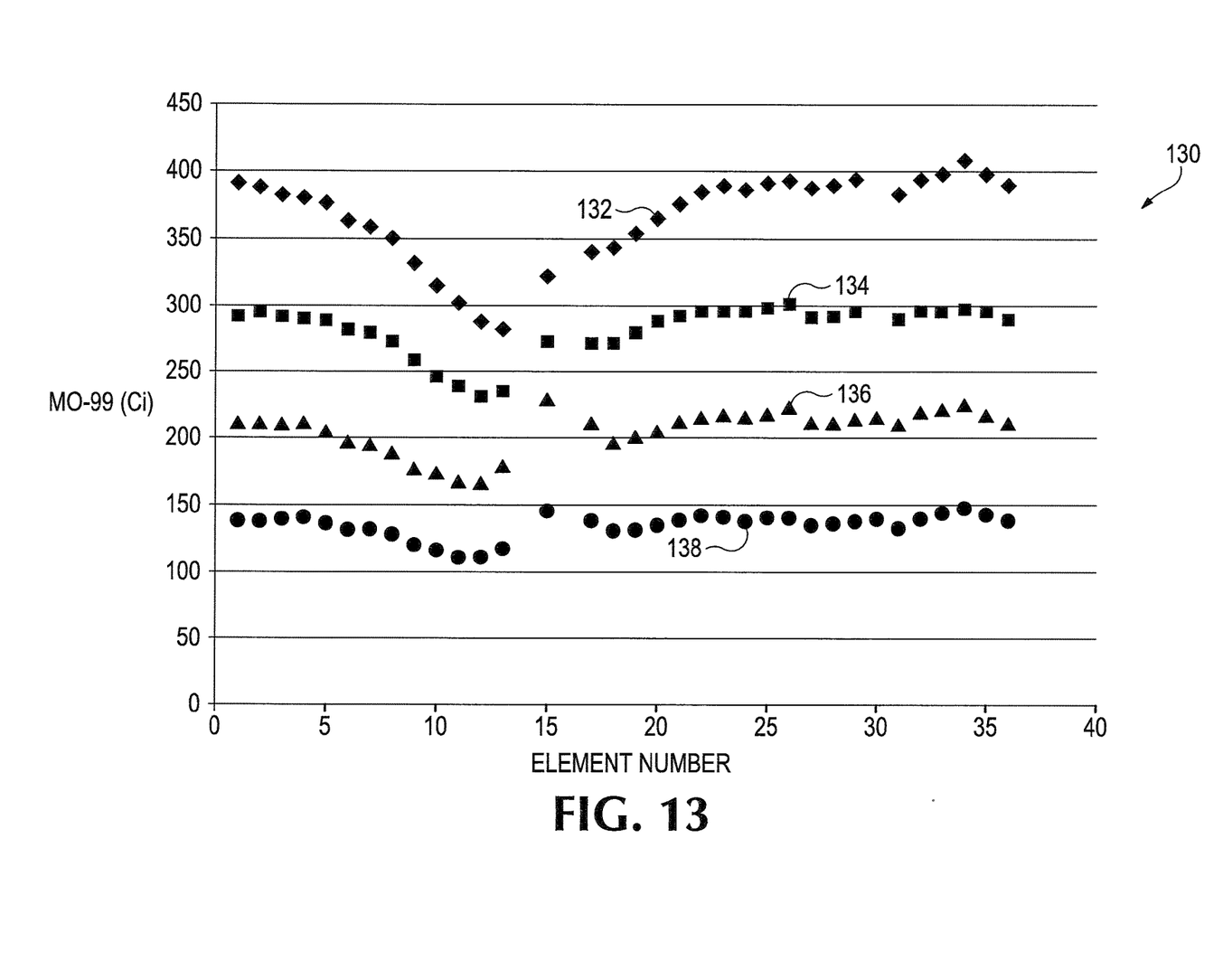
FIG. 13 illustrates a table showing a comparison between various targets.

FIG. 13 illustrates a table 130 showing a comparison between various targets using an example moderator of water. The illustrated table 130 compares the production rate of molybdenum as a function of position, or element number, of a target located in the outer ring 122 of the lattice configuration 120 of FIG. 12. The molybdenum production rate for a first target 132 comprising beryllium cladding and a central region comprising a neutron thermalization volume or neutron moderator of water, such as the central region 15 of FIG. 1, is illustrated as varying between approximately 280 Curies (Ci) and 405 Curies.

The molybdenum production rate for a second target 134 comprising stainless steel cladding and a central region comprising a neutron thermalization volume or neutron moderator of water is illustrated as varying between approximately 230 Curies and 300 Curies. Both the first target 132 and the second target 134 may comprise 200 grams of fissile material, for purposes of the present illustration and comparison.

The molybdenum production rate for a third target 136 comprising 200 grams of fissile material and a vacuum chamber, such as the vacuum chamber 115 of FIG. 11, is illustrated as varying between approximately 160 Curies and 230 Curies. The molybdenum production rate for a fourth target 138 comprising 100 grams of fissile material and a vacuum chamber is illustrated as varying between approximately 105 Curies and 150 Curies.

The first target 132 and the second target 134 may generally be understood to provide for a higher isotope production rate than either the third target 136 or the fourth target 138. By including a central region comprising a neutron thermalization volume or neutron moderator, the first target 132 and the second target 134 may be able to more efficiently utilize the available neutrons, e.g., neutron flux, by effectively increasing the number of thermal neutrons in the target, and thereby increasing the fission rate of the fissile material.

Including a central neutron thermalization volume in the target may provide for an improved and more cost-effective method for the production of molybdenum and other isotopes, such as plutonium. For the same neutron flux, some example targets comprising the central neutron thermalization volume may produce approximately three times the amount of molybdenum in a low power reactor compared to a target comprising a vacuum chamber. Other types of cladding may be utilized in various example targets, including zirconium, zirc-alloy, aluminum, ceramics, other materials, or any combination thereof.

Figure 14:
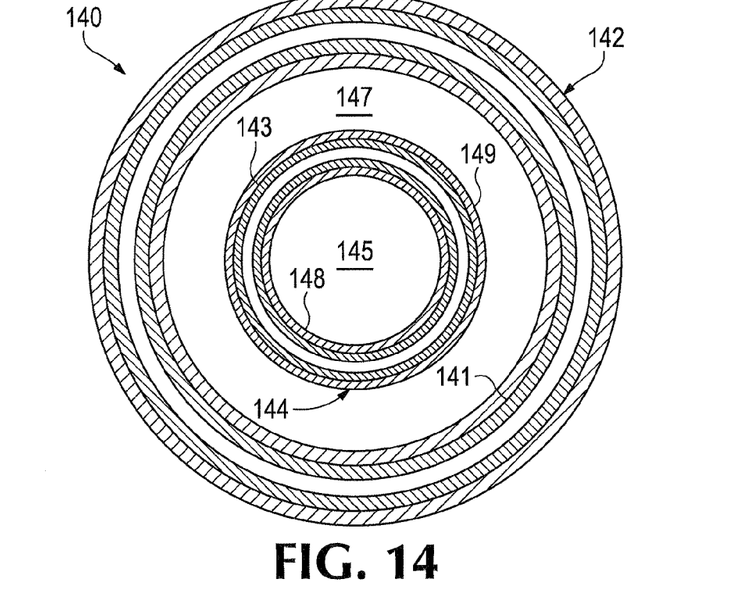
FIG. 14 illustrates an example target and a multi-layered source structure.

FIG. 14 illustrates an example target 140 and a multi-layered source structure. The target 140 is illustrated as comprising a first cladding assembly 142 and a second cladding assembly 144. The second cladding assembly 144 may be nested within the first cladding assembly 142. The first cladding assembly 142 may comprise a first source 141 of fissile material, and the second cladding assembly 144 may comprise a second source 143 of fissile material. The geometry of the multi-layer source structure may be used to increase the mass of the fissile material as compared to a target comprising a single layer of fissile material, for example.

A central region 145 of the target 140 may be located within an inner wall 148 of the second cladding assembly 144. The central region 145 may comprise a neutron thermalization volume or neutron moderator, such as water or primary coolant. Additionally, an intermediate region 147 may comprise a neutron thermalization volume or neutron moderator, such as water or primary coolant. The intermediate region 147 may be located outside of an outer wall 149 of the second cladding assembly 144, for example between the first cladding assembly 142 and the second cladding assembly 144.

In one example, water or other types of primary coolant may be allowed to flow through the central region 145 and/or the intermediate region 147, such that there may be two or more channels of water flowing through the target 140. Furthermore, including the intermediate region 147 between the first source 141 of fissile material and the second source 143 of fissile material may reduce the effect of self-shielding due to the increased mass of fissile material in the target 140. The rate of neutron thermalization and/or the rate of isotope production may be controlled by configuring the target 140 to vary the amount of fissile material and/or to adjust the volume and/or the rate of flow of the water through the target 140.

Example Modes of Operation

Figure 15:
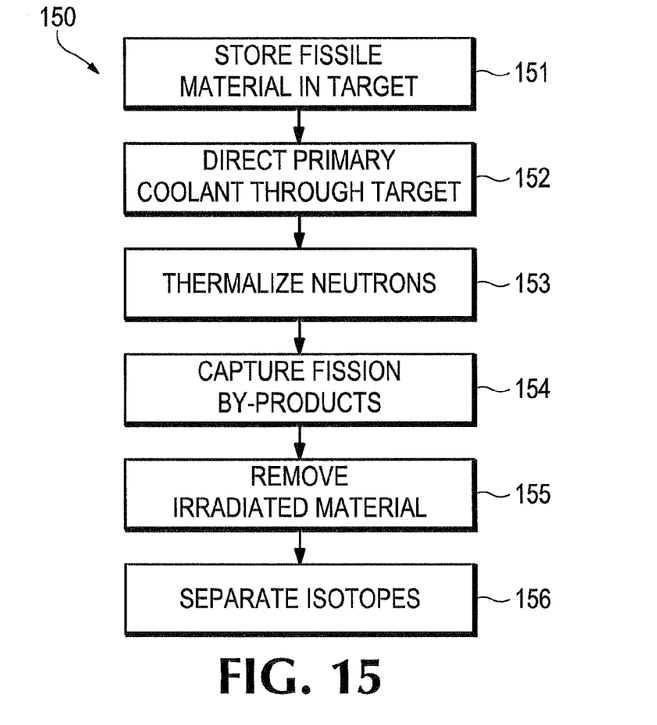
FIG. 15 illustrates an example process of isotope production.

FIG. 15 illustrates an example process 150 of isotope production. At operation 151, fissile material located between an outer wall and an inner wall of an isotope production target may be stored. A fissile material housing may comprise the outer wall and the inner wall. The fissile material may be stored in a target chamber located between the outer wall and the inner wall.

At operation 152, primary coolant, such as water, may be directed through the isotope production target. The primary coolant may be directed through a central region or channel of the isotope production target. In one example, the primary coolant may be directed through the isotope production target by a mounting device located at one or both ends of the isotope production target.

At operation 153, neutrons generated during fission events of the fissile material may be thermalized in a central region of the isotope production target. The neutrons may be generated in response to irradiating the fissile material with a neutron source. The central region may comprise a neutron thermalization volume or neutron moderator, such as light water, heavy water, graphite, zirconium, plastic, wax, paraffin, hydrogenous materials, other types of neutron moderators, or any combination thereof. In one example, the central region may comprise primary coolant associated with a reactor core.

The central region may comprise water that thermalizes the neutrons generated during the fission events, and the thermalized neutrons may cause additional fission events of the irradiated material. In one example, the number of fission events may be approximately doubled due to the thermalized neutrons versus a target which is only irradiated with neutrons born from the neutron source located outside of the target.

At operation 154, fission by-products generated during fission events of the irradiated material may be captured in one or more voided regions interspersed with the fissile material. The one or more voided regions may be located between the outer wall and the inner wall of the isotope production target. In one example, the one or more voided regions may be interspersed between a plurality of objects, such as balls or pellets, comprising the fissile material. In another example, the fission by-products may be stored in an annulus located between two layers or sheets of the fissile material.

At operation 155, the irradiated material may be removed from the isotope production target. In one example, one or more ends of the isotope production target may be removed, e.g., cut, prior to removing the irradiated material. Fissile material stored as a plurality of objects may be loosely contained in the isotope production target and the irradiated material may be physically removed from the isotope production target without any chemical or thermal treatment. In one example, the fissile material may be stored as one or more sheets, foils, tubes, or the like, within the target chamber. The fissile material may adhere, e.g., be sputtered, on the inner wall and/or the outer wall of the target chamber.

At operation 156, the irradiated material may be chemically treated to separate the isotopes, e.g., molybdenum isotopes. The irradiated material may be treated in a chemical bath or an acid bath, for example. In one example, the irradiated material may be chemically treated after the irradiated material has been removed from the isotope production target. In another example, the irradiated material may be chemically treated while it remains in the isotope production target.

For the sake of convenience, the operations may be described as various interconnected functional blocks or diagrams. This is not necessary, however, and there may be cases where these functional blocks or diagrams are equivalently aggregated into a single operation with unclear boundaries, and/or where one or more of the operations may be omitted from the process.

Whereas certain examples have described using the target in a low power reactor, such as a TRIGA® reactor, one skilled in the art would appreciate that the target may also be used in plate fuel-type research reactors or in high power reactors, for example with power capacity greater than ten megawatts thermal. Whereas various examples may be described with the target comprising LEU, other examples may include HEU, uranium oxide $UO_2$, plutonium, $^{233}U$, or any combination thereof.

Having described and illustrated the principles of various examples, it should be apparent that the examples may be modified in arrangement and detail without departing from such principles. I claim all modifications and variations coming within the spirit and scope of the following claims.

The invention claimed is:

1. An isotope production target, comprising:
   an outer diameter wall;
   an inner diameter wall located within the outer diameter wall, wherein a top of both the inner diameter wall and the outer diameter are sealed together and a bottom of both the inner diameter wall and the outer diameter are sealed together to form a sealed chamber;
   an isotope source comprising particles of fissile material loosely placed between the inner diameter wall and the outer diameter wall to facilitate removal of the loosely placed particles of fissile material after irradiation of the isotope production target, wherein the loosely placed particles of fissile material are in contact with each other and interspersed with a plurality of voided regions around each of the loosely placed particles of fissile material in the sealed chamber to capture fission gases released from the loosely placed particles of fissile material due to the irradiation of the isotope production target; and
   a central region located within the inner diameter wall, wherein the central region houses a neutron thermalization volume.

2. The isotope production target of claim 1, wherein the plurality of voided regions located in the sealed chamber capture the fission gases produced from irradiation of the loosely placed particles of fissile material, and wherein the plurality of voided regions remain in place during operation of the isotope production target.

3. The isotope production target of claim 2, wherein the one or more voided regions are sealed between the outer diameter wall and the inner diameter wall to prevent the fission gases from exiting the isotope production target.

4. The isotope production target of claim 1, wherein the loosely placed particles of fissile material are substantially ball-shaped, and wherein the plurality of voided regions are formed around contact points of adjacent ball-shaped particles.

5. The isotope production target of claim 1, wherein the loosely placed particles of fissile material comprise powder, and wherein the plurality of voided regions are formed around contact points of adjacent particles of the powder.

6. The isotope production target of claim 1, wherein the neutron thermalization volume comprises water.

7. The isotope production target of claim 6, wherein the isotope production target is configured to be installed in a reactor core, and wherein the water comprises a primary coolant associated with the reactor core.

8. The isotope production target of claim 7, wherein the reactor core is associated with a reactor of less than twenty megawatts thermal, and wherein the isotope source comprises low-enriched uranium (LEU).

9. The isotope production target of claim 1, wherein the central region is configured to cause neutrons that are generated in the loosely placed particles of fissile material to be thermalized by the neutron thermalization volume before re-entering the loosely placed particles of fissile material.

10. The isotope production target of claim 1, wherein the loosely placed particles of fissile material comprise substantially round balls of fissile material.

11. The isotope production target of claim 1, wherein the loosely placed particles of fissile material comprise fissile powder.

12. The isotope production target of claim 1, wherein the sealed chamber comprises an annular-shaped isotope production chamber located between the outer diameter wall and the inner diameter wall, and wherein one or more of the loosely placed particles of fissile material are in contact with at least one other particle located along a circumference of the annular-shaped isotope production chamber.

13. An isotope production target, comprising:
   an isotope source comprising particles of fissile material;
   means for housing the particles of fissile material, wherein the particles of fissile material are loosely placed within the means for housing to facilitate removal of the loosely placed particles of fissile material after irradiation of the isotope production target, and wherein the loosely placed particles of fissile material are interspersed with a plurality of voided regions around contact points of laterally adjacent particles located in a circumference of the means for housing to capture fission gases released from the loosely placed particles of fissile material due to the irradiation of the isotope production target; and
   means for thermalizing neutrons located within a central region of the isotope production target.

14. The isotope production target, of claim 13, wherein the means for thermalizing comprises primary coolant associated with a reactor core.

15. The isotope production target, of claim 14, further comprising means for directing the primary coolant through the isotope production target.

16. The isotope production target, of claim 13, wherein the loosely placed particles of fissile material comprise substantially round balls of fissile material.

17. The isotope production target, of claim 13, wherein the loosely placed particles of fissile material are stored in a powder form in the means for housing.

18. The isotope production target, of claim 13, wherein the means for housing comprises an enclosed annular-shaped isotope production chamber, and wherein each of the loosely placed particles of fissile material are in contact with at least one other particle located along a circumference of the annular-shaped isotope production chamber.

19. The isotope production target, of claim 13, wherein the plurality of voided regions are configured to capture the fission gases generated from irradiating the loosely placed particles of fissile material located in the means for housing.

20. The isotope production target, of claim 13, wherein the loosely placed particles of fissile material are substantially ball-shaped, and wherein the plurality of voided regions are formed between contact points of adjacent ball-shaped particles.

21. The isotope production target, of claim 13, further comprising:
   means for directing primary coolant associated with a reactor core to pass through the central region.

22. The isotope production target of claim 21, wherein the primary coolant is directed through the central region of the isotope production target to thermalize neutrons generated by the isotope production target before the neutrons re-enter the loosely placed particles of fissile material and generate further neutrons that are thermalized by the primary coolant in the central region.

* * * * *